US008831298B2

(12) United States Patent
Farkash

(10) Patent No.: US 8,831,298 B2
(45) Date of Patent: Sep. 9, 2014

(54) SYSTEM AND METHOD FOR IDENTIFYING A USER THROUGH AN OBJECT HELD IN A HAND

(75) Inventor: Eyal Farkash, Raanana (IL)

(73) Assignee: Cisco Technology Inc., San Jose, CA (US)

( * ) Notice: Subject to any disclaimer, the term of this patent is extended or adjusted under 35 U.S.C. 154(b) by 80 days.

(21) Appl. No.: 13/805,576

(22) PCT Filed: Jun. 20, 2011

(86) PCT No.: PCT/IB2011/052683
§ 371 (c)(1),
(2), (4) Date: Jan. 8, 2013

(87) PCT Pub. No.: WO2012/001570
PCT Pub. Date: Jan. 5, 2012

(65) Prior Publication Data
US 2013/0101185 A1    Apr. 25, 2013

(30) Foreign Application Priority Data

Jun. 29, 2010   (GB) .................................. 1010869.4

(51) Int. Cl.
*G06K 9/00*   (2006.01)
*G06K 9/46*   (2006.01)
(52) U.S. Cl.
CPC .......... *G06K 9/00006* (2013.01); *G06K 9/4642* (2013.01); *G06K 9/0008* (2013.01); *G06K 9/00375* (2013.01)
USPC ....................................................... 382/124
(58) Field of Classification Search
None
See application file for complete search history.

(56) References Cited

U.S. PATENT DOCUMENTS

| 5,666,412 | A | 9/1997 | Handelman et al. |
| 5,777,571 | A | 7/1998 | Chuang |
| 5,862,246 | A | 1/1999 | Colbert |
| 5,945,988 | A | 8/1999 | Williams et al. |
| 6,359,661 | B1 | 3/2002 | Nickum |
| 6,668,071 | B1 | 12/2003 | Minkin et al. |

(Continued)

FOREIGN PATENT DOCUMENTS

| WO | WO 03/053060 A1 | 6/2003 |
| WO | WO 03/103211 A2 | 12/2003 |
| WO | WO 2006/053324 A1 | 5/2006 |
| WO | WO 2008/002365 A2 | 1/2008 |

OTHER PUBLICATIONS

Transmittal of International Search Report and Written Opinion of International Searching Authority (Dec. 13, 2011) for captioned application.

(Continued)

*Primary Examiner* — Daniel Mariam
(74) *Attorney, Agent, or Firm* — Husch Blackwell LLP

(57) ABSTRACT

A system and method for identifying a user through an object held by a hand of the user, according to an image of the skin surface print of a portion of the hand of the user, which is optionally the skin surface print of at least a portion of the hand between the metacarpophalangeal joint and a distal interphalangeal joint of one or more fingers. Optionally, the image only includes the skin surface print of at least a portion of the hand between the metacarpophalangeal joint and a distal interphalangeal joint of one or more fingers. The method for identifying the user may also optionally only use selected portions of this image as described herein. Related apparatus and methods are also described.

18 Claims, 9 Drawing Sheets

(56) References Cited

U.S. PATENT DOCUMENTS

| | | | |
|---|---|---|---|
| 6,771,901 | B2 | 8/2004 | Gennetten et al. |
| 7,359,531 | B2 | 4/2008 | Endoh et al. |
| 7,466,348 | B2 | 12/2008 | Morikawa et al. |
| 8,295,549 | B2 * | 10/2012 | Marks et al. ............... 382/103 |
| 8,614,621 | B2 * | 12/2013 | Sobel et al. ............... 340/5.52 |
| 2003/0108227 | A1 | 6/2003 | Philomin et al. |
| 2004/0264742 | A1 | 12/2004 | Zhang et al. |
| 2006/0067164 | A1 | 3/2006 | Takai et al. |
| 2007/0058841 | A1 | 3/2007 | Miura et al. |
| 2008/0240514 | A1 | 10/2008 | Zhang et al. |
| 2009/0146779 | A1 | 6/2009 | Kumar et al. |

OTHER PUBLICATIONS

Oct. 18, 2010 Office Communication in connection with prosecution of GB 10 10869.4.

Kipsang Choge et al., "Palmprint Recognition Based On Local DCT Feature Extraction," *ICONIP 2009*, pp. 639-648 (Springer Verlag 2009).

R.B. Fisher et al., *Dictionary Of Computer Vision And Image Processing*, pp. 33, 77, 145 (John Wiley & Sons—2005).

Aythami Morales et al., "A Knuckles Texture Verification Method In A Transferred Domain" (Jun. 5, 2007).

Lua Rongfang et al., "Finger Crease Identification Based On Discrete Cosine Transform" (2007).

Lin Zhang et al., "Ensemble Of Local And Global Information For Finger-Knuckle-Print Recognition," *Pattern Recognition 44*, pp. 1990-1998. (Elsevier 2010).

Lin Zhang et al., "Finger-Knuckle-Print Verification Based On Band-Limited Phase-Only Correlation," *CAIP 2009*, pp. 141-148 (Springer Verlag 2009).

Richard L. Zunkel, "Hand Geometry Based Authentication," *Biometrics: Personal Identification in Networked Society* (Kluwer Academic Publishers 1998).

"Ruwido," Product Description of Ruwido Voco Media Navigator available at www.ruwido.com/products/voco-media/navigator/ (Feb. 23, 2010).

"Voco Media" (2007).

May 15, 2013 Office Communication in connection with prosecution of GB 1010869.4.

* cited by examiner

SYSTEM AND METHOD FOR IDENTIFYING A USER THROUGH AN OBJECT HELD IN A HAND

The present application is a 35 USC §371 application of PCT/IB2011/052683, filed on 20 Jun. 2011 and entitled "SYSTEM AND METHOD FOR IDENTIFYING A USER THROUGH AN OBJECT HELD IN A HAND", which was published in the English language with. International Publication Number WO2012/001570, and which claims the benefit of priority from of UK Patent Application 1010869.4, filed 29 Jun. 2010.

FIELD OF THE INVENTION

The present invention relates to a system and method for identifying a user through an object held by a hand of the user, and particularly, but not exclusively, to such a system and method for use in a television system.

BACKGROUND OF THE INVENTION

Various solutions are known in the art for identifying a person, for example through a fingerprint or other biometric identification methods. Electronic devices for biometric identification may for example be used to capture an image of the person's fingerprint, which is then compared to a database of such fingerprints, and/or may be used to capture other types of biometric information. Some examples of patents and applications in this area include U.S. Pat. No. 6,668,071 to Minkin et al; U.S. Published Patent Application No. 2006/0067164 to Takai et al; U.S. Pat. No. 7,359,531 to Endoh et al; U.S. Published Patent Application No. 2007/0058841 to Miura; U.S. Published Patent Application No. 2004/0264742 to Zhang et al; U.S. Published Patent Application No. 2008/0240514 to Zhang et al; and U.S. Pat. No. 6,771,901 to Gennetten et al.

One example of applications of biometric identification methods include applications related to controlling entertainment devices, such as for example remote control devices, as in U.S. Pat. No. 5,945,988 to Williams et al; or U.S. Pat. No. 5,777,571 to Chuang et al.

A non-limiting example of a parental control system is provided in U.S. Pat. No. 5,666,412 to Handelman et al.

SUMMARY OF THE INVENTION

In the opinion of the inventor of the present invention, the background art does not teach or suggest a system or method for identifying a user through an object held by a hand of the user, which does not require excessive computational power and which is efficient. Also in the opinion of the inventor of the present invention, the background art also does not teach or suggest such a system or method for use in a television system.

The present invention, in at least some embodiments, overcomes these drawbacks of the background art, by providing a system and method for identifying a user through an object held by a hand of the user, according to an image of the skin surface print of a portion of the hand of the user, which is for example the skin surface print of at least a portion of the hand between the metacarpophalangeal joint and a distal interphalangeal joint of one or more fingers. The colloquial term for the metacarpophalangeal joint is the "knuckle". The colloquial term for the distal interphalangeal joint is the third joint of the finger, just below the finger tip. Therefore, an image of the skin surface print of at least a portion of the hand between the metacarpophalangeal joint and a distal interphalangeal joint of one or more fingers would not include an image of any of the fingerprints as the term "fingerprints" is used in the art.

As defined herein, the term "skin surface print" refers to the whorls and lines on the surface of the skin of the hand, but does not refer to pattern of the veins, outline of the hand or fingers, and so forth.

According to at least some embodiments of the present invention, there is provided a method for identifying a person holding an object with a hand, wherein the object comprises an image capture device and a transmitter, the method comprising:

providing a remote processing device comprising a receiver and a database, wherein the transmitter of the object and the receiver of the remote processing device are in communication and wherein the remote processing device and the object are physically separate;

capturing an image of at least a portion of the hand, the portion of the hand comprising at least a portion of the hand between a metacarpophalangeal joint and a distal interphalangeal joint of one or more fingers, the image featuring only a skin surface print;

sending the image with the transmitter to the receiver;

constructing a signature from data from the image by the remote processing device; and searching through the database for a matching signature to the signature obtained from the image to identify the person.

Optionally, the image capture device comprises a camera and a light source. Optionally, the light source comprises an infra red diode.

Optionally the capturing the image comprises capturing an image of only a portion of the hand between a metacarpophalangeal joint and a distal interphalangeal joint of one or more fingers.

Also optionally the constructing the signature results in loss of data such that the signature matches a correctly matching signature to identify the person with up to 80% accuracy.

Optionally (additionally or alternatively) the constructing the signature comprises converting the image to luminance levels to form a luminance matrix and converting the luminance matrix to form a vector through a lossy conversion process, wherein the signature comprises the vector.

Optionally, the converting the luminance matrix to the vector comprises dividing the luminance matrix into blocks of N by N pixels, wherein N refers to a number of pixels in each row and in each column of each block of the luminance matrix, and applying a lossy conversion process to the blocks comprising a transform selected from the group consisting of a DCT (discrete cosine transform) transform, and a DFT (discrete Fourier transform).

Optionally, the dividing the luminance matrix into blocks of N by N pixels comprises selecting only a portion of the blocks for applying the lossy conversion process.

Optionally, the applying the lossy conversion process further comprises applying a filter after applying the transform. Also optionally, the applying the filter further comprises applying a power vertical vector.

Optionally the selecting only a portion of the blocks for applying the lossy conversion process is performed more than once, such that vector is generated more than once for each captured image.

Optionally, the selecting only a portion of the blocks is performed repeatedly from contiguous portions of blocks from the image.

Optionally the method further comprises providing a television receiver for receiving a television signal and a display device in communication with the television receiver, wherein the object is a viewer control for controlling the television receiver and the remote processing device is in communication with the television receiver, the method further comprising identifying the person according to the vector to form an identification of the person; providing the identification to the television receiver by the remote processing device; and adjusting at least one function of the television receiver according to the identification.

Optionally, the television receiver comprises the remote processing device, such that the remote processing device is physically connected to or integrally formed with the television receiver.

Optionally the television receiver receives a television signal selected from the group consisting of a broadcast television signal, a unicast signal, a multicast signal, a signal transmitted over a cellular telephone network, a signal transmitted over a computer network, a signal transmitted by satellite and a signal transmitted by a cable television network.

Optionally, the method further comprises controlling access to the television signal according to the identification. Optionally, the controlling access further comprises purchasing access to the television signal according to the identification. Optionally, the controlling access further comprises applying one or more parental controls according to the identification.

Optionally, the image comprises at least 160 pixels by 120 pixels.

Also optionally the method further comprises registering a new person to the database by capturing the image of the portion of the hand more than once to form a plurality of captured images; converting the plurality of captured images to a plurality of vectors; and storing the plurality of vectors in the database with at least one identifier of the new person.

Optionally, the at least one identifier of the new person is a relative identifier to distinguish the vectors of the new person from vectors of one or more other persons in the database.

Optionally, the at least one identifier of the new person is an absolute identifier selected from the group consisting of a PIN code, and a name.

According to at least some embodiments of the present invention, there is provided a system for identifying a person, the person having a hand, the system comprising:

an object held by at least a portion of the hand of the person, wherein the object comprises an image capture device and a transmitter, wherein the image capture device captures an image of at least a portion of the hand, the image featuring only a skin surface print, the transmitter transmitting the image;

a remote processing device comprising a receiver and a database, wherein the transmitter of the object and the receiver of the remote processing device are in communication, such that the receiver receives the image from the transmitter, and wherein the remote processing device and the object are physically separate, wherein the remote processing device constructs a signature from data from the image and searches through the database for a matching signature to the signature obtained from the image to identify the person.

According to at least some embodiments of the present invention, there is provided a method for identifying a person holding an object with a hand, the method comprising:

providing the object, wherein the object comprises an image capture device and a transmitter, and a remote processing device comprising a receiver and a database, wherein the transmitter of the object and the receiver of the remote processing device are in communication and wherein the remote processing device and the object are physically separate;

capturing an image of at least a portion of the hand, the image featuring only a skin surface print;

sending the image with the transmitter to the receiver;

constructing a signature from data from the image by the remote processing device, wherein the data only includes a portion of the hand up to but not including any fingertips; and searching through the database for a matching signature to the signature obtained from the image to identify the person.

Optionally, the image is of a portion of the hand up to but not including any fingertips, such that either the capturing the image comprises capturing an image of a portion of the hand up to but not including any fingertips or alternatively, the sending the image with the transmitter comprises sending only an image of a portion of the hand up to but not including any fingertips.

According to at least some embodiments of the present invention, there is provided a method for identifying a person holding an object with a hand, wherein the object comprises an image capture device and a transmitter, the object being communication with a remote processing device comprising a receiver and a database, wherein the remote processing device and the object are physically separate, the method comprising:

capturing an image of at least a portion of the hand, the portion of the hand comprising at least a portion of the hand between a metacarpophalangeal joint and a distal interphalangeal joint of one or more fingers, the image featuring only a skin surface print;

sending the image with the transmitter to the receiver;

constructing a signature from data from the image by the remote processing device; and searching through the database for a matching signature to the signature obtained from the image to identify the person.

According to at least some embodiments of the present invention, there is provided a method for identifying a person holding an object with a hand, wherein the object includes an image capture device and a transmitter, the transmitter being in communication with a remote processing device including a receiver and a database, wherein the transmitter of the object and the receiver of the remote processing device are in communication and wherein the remote processing device and the object are physically separate, the method including capturing an image of at least a portion of the hand, the portion of the hand including at least a portion of the hand between a metacarpophalangeal joint and a distal interphalangeal joint of one or more fingers, the image featuring only a skin surface print, and sending the image with the transmitter to the receiver, wherein the remote processing device constructs a signature from data from the image, and the method also includes searching through the database for a matching signature to the signature obtained from the image to identify the person.

According to at least some embodiments of the present invention, there is provided a system for identifying a person, the person having a hand, the system including an object held by at least a portion of the hand of the person, wherein the object includes an image capture device and a transmitter, wherein the image capture device captures an image of at least a portion of the hand, the image featuring only a skin surface print, the transmitter transmitting the image to a remote processing device external to the system, the remote processing device including a receiver and a database, wherein the transmitter of the object and the receiver of the remote processing device are in communication, such that the receiver receives the image from the transmitter, and wherein the remote processing device and the object are physically separate, wherein the remote processing device constructs a signature from data from the image and searches through the database for a matching signature to the signature obtained from the image to identify the person, and wherein the image is of a portion of the hand up to but not including any fingertips, such that either the image capture device captures the image of a portion of the hand up to but not including any fingertips or alternatively, the transmitter transmits only an image of a portion of the hand up to but not including any fingertips.

According to at least some embodiments of the present invention, there is provided a method for identifying a person holding an object with a hand, the object being in communication with a remote processing device, the remote processing device including a receiver and a database, the method including providing the object, wherein the object includes an image capture device and a transmitter, the transmitter of the object and the receiver of the remote processing device being in communication and the remote processing device and the object being physically separate, capturing an image of at least a portion of the hand, the image featuring only a skin surface print, sending the image with the transmitter to the receiver, wherein the remote processing device constructs a signature from data from the image, the data only including a portion of the hand up to but not including any fingertips, the method also including searching through the database for a matching signature to the signature obtained from the image to identify the person, wherein the image is of a portion of the hand up to but not including any fingertips, such that either the capturing the image includes capturing an image of a portion of the hand up to but not including any fingertips or alternatively, the sending the image with the transmitter includes sending only an image of a portion of the hand up to but not including any fingertips.

BRIEF DESCRIPTION OF THE DRAWINGS

The present invention will be understood and appreciated more fully from the following detailed description, taken in conjunction with the drawings in which.

DETAILED DESCRIPTION OF SOME EMBODIMENTS

The present invention, in at least some embodiments, provides a system and method for identifying a user through an object held by a hand of the user, according to an image of the skin surface print of a portion of the hand of the user, which is optionally the skin surface print of at least a portion of the hand between the metacarpophalangeal joint and a distal interphalangeal joint of one or more fingers. Optionally, the image only includes the skin surface print of at least a portion of the hand between the metacarpophalangeal joint and a distal interphalangeal joint of one or more fingers. The method for identifying the user may also optionally only use selected portions of this image as described herein.

Optionally, the image of the portion of the hand is captured at the object but is processed at a remote receiver, which is physically separate from the object. Various implementations of the object and remote receiver are encompassed within different embodiments of the present invention; a non-limiting example as provided herein relates to a remote control for a television signal receiver as the object and the television signal receiver itself as the remote receiver.

Figure 1:
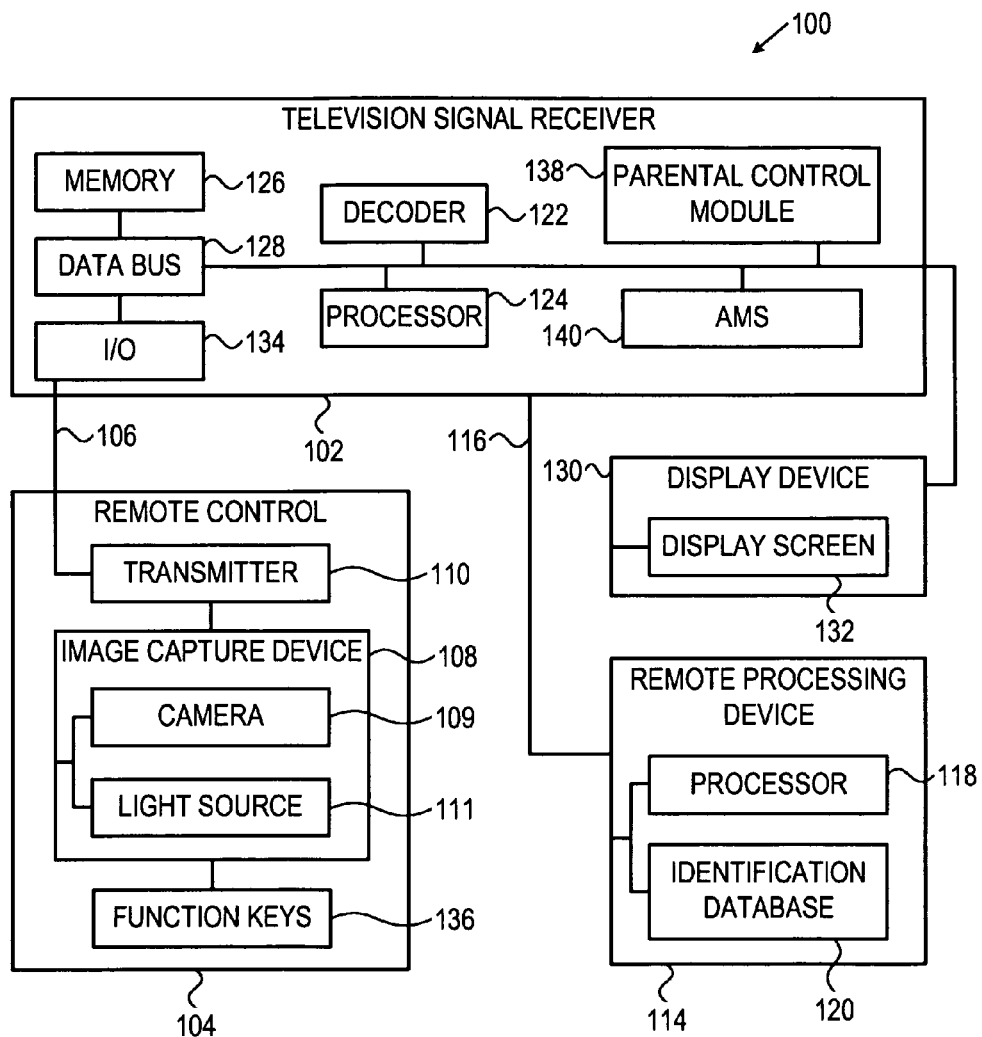
FIG. 1 shows a simplified block diagram illustration of a system for identifying a user of a remote control device, the system being constructed and operative in accordance with an exemplary embodiment of the present invention.

Reference is now made to FIG. 1 which is a simplified block diagram illustration of a system for identifying a user holding an object, the system being constructed and operative in accordance with an exemplary embodiment of the present invention. For this non-limiting example, the object is a remote control in communication with a television signal receiver, although it is understood that optionally many different objects could be implemented for identification of the user according to various embodiments of the present invention. For example, the object may optionally be implemented as a remote control, but it is not necessarily in communication with a television signal receiver (or with a television signal receiver as part of a system of the below type) and in fact could optionally be in contact with any electronic device of any type. Also the object is not necessarily a remote control. The description below is intended as a non-limiting example only.

Optionally, the system 100 includes a television signal receiver 102 for receiving television signals from a transmission network (not shown), which may optionally include a satellite, broadcasting, a cable network, through any type of unicast or multicast technology, over a computer network or from a cellular telephone network (not shown). The term "broadcaster" optionally refers to any entity transmitting content over the transmission network, or the transmission network itself or any part thereof. By "television signal" it is meant various types of transmitted material, such as television programs, commercials, video clips, program guides and electronic program guides (EPGs), data, multimedia information, hypermedia links, computer programs, computer data and applications which may be downloaded, program applets and teletex. For this non-limiting example of FIG. 1, the television signals are assumed to be video streams.

Television signal receiver 102 is optionally in communication, which may optionally be wired or wireless communication, with a remote control 104 through a communication channel 106. Remote control 104 is held in the hand of a user (not shown), such that at least a portion of the hand between the metacarpophalangeal joint and a distal interphalangeal joint of one or more fingers contacts remote control 104. As described in greater detail below, remote control 104 optionally features an image capture device 108 and a transmitter 110. Image capture device 108 may optionally comprise a camera 109 and a light source 111. Light source 111 optionally comprises an infra red diode for example.

Image capture device 108 captures an image of at least a portion of the skin surface print of the hand between the metacarpophalangeal joint and a distal interphalangeal joint of one or more fingers, optionally through lighting this area with light source 111 and image capture by camera 109 when the area is lit. Optionally only the skin surface print is captured. The image may optionally also include one or more fingerprints, although as described in greater detail below, optionally the image of the fingerprints is not used for identification. The captured image, or optionally a portion thereof (for example, optionally a portion that does not include any image of the fingerprints), is sent via transmitter 110 to an I/O interface 134 at television signal receiver 102.

Television signal receiver 102 in turn features a remote processing device 114 for processing data from the image to construct a signature that may be used to identify the user holding remote control 104. As shown, remote processing device 114 is in communication with television signal receiver 102 through a communication channel 116, which may for example be the same or different as communication channel 106 and which may optionally feature wired or wireless communication. Remote processing device 114 may optionally be physically separated from television signal receiver 102 or may optionally be combined with television signal receiver 102; in the latter case, communication channel 116 may optionally be implemented as a data bus (not shown).

Remote processing device 114 optionally also features a processor 118 and an identification database 120 as shown (particularly for the implementation in which remote processing device 114 is separate from television signal receiver 102). Processor 118 operates the various functions of remote processing device 114, including for example with regard to image processing, as described in greater detail below. Identification database 120 optionally includes one or more signatures that are associated with one or more users of remote control 104. Once the hand of the user contacts remote control 104 as previously described, image data is sent to television signal receiver 102 which in turn passes the image data to remote processing device 114. Optionally, remote processing device 114 receives such data directly from remote control 104 (not shown). Remote processing device 114 then processes the image data to form a signature.

As described in greater detail with regard to FIG. 2 below, the method for processing data from the image to construct a signature that may be used to identify the user holding remote control 104 is optionally a lossy method. Optionally, the lossy method results in loss of data such that said signature matches a correctly matching signature to identify the user with up to 80% accuracy. Various non-limiting examples of such lossy methods include a transform selected from the group consisting of a DCT (discrete cosine transform) transform, and a DFT (discrete Fourier transform). The use of a lossy method, as well as various other aspects of the method as described herein, enable the signature to be constructed rapidly and efficiently, without excessive computational power.

Remote processing device 114 uses the signature as a key to search identification database 120. If a match is found, then the user is identified according to the match. Optionally as described in greater detail below, such a match may be used to control access to the television signals.

For this non-limiting embodiment with regard to television signal receiver 102 receiving television signals and for controlled access to such signals optionally being determined according to user identification, as shown, television signal receiver 102 receives a video stream and then optionally decodes the video stream through a decoder 122 to form a decoded video stream. For example, television signal receiver 102 and decoder 122 may optionally be implemented as an integrated receiver and decoder (IRD). Operation of television signal receiver 102 and decoder 122 is optionally controlled by a processor 124 in television signal receiver 102.

Television signal receiver 102 optionally also comprises a memory 126 and a data bus 128. Memory 126 may optionally comprise flash memory, a conventional high capacity hard disk as used in conventional personal computers or a plurality of high capacity hard disks, or a combination thereof.

The decoded video stream is then displayed on a display device 130 which may include any appropriate type of a conventional display, such as a television for example, which is in communication with television signal receiver 102 through data bus 128. Display device 130 may optionally be wireless or wired communication with television signal receiver 102, or optionally may be integrated with television signal receiver 102.

Display device 130 is optionally capable of displaying both the visual content of the video stream and also the audio content; the latter content may optionally be displayed by any type of speaker(s) or audio systems (not shown), which may be integrated with or separate from a display screen 132 of display device 130. Display device 130 may therefore comprise a plurality of physically separated components in wireless or wired communication, or an integrated unit.

Optionally as shown, remote control 104 communicates with television signal receiver 102 through an input/output (I/O) interface 134 at television signal receiver 102 (remote control 102 is shown as being connected to I/O interface 134 with a line for the purpose of illustration only; communication is optionally wireless). I/O interface 134 is optionally operatively associated with processor 124. It is appreciated that instructions and selections inputted by the viewer via remote control 104 are executed by the processor 124. Optionally, remote control 104 includes a plurality of function keys 136 for operating special functions as described below. When the user wishes to enter a command, the user selects one or more function keys 136 on remote control 104. Remote control 104 then sends one or more signals to television signal receiver 102 through I/O interface 134, thereby instructing television signal receiver 102 to execute one or more actions. However, optionally the process of identifying the user holding remote control 104 occurs automatically, without the active intervention of the user, in contrast to other commands, which are optionally entered by the manual actions of the user.

For example, light source 111 may light the appropriate portion of the hand of the user upon first sensing contact with remote control 104 (for example, upon depressing of a function key 136 or some other activity after a "sleep period") and/or for periodic image capture. Lighting of the area by light source 11 is optionally coupled to image capture by camera 109 when the area is lit. Image capture is then optionally followed by data processing and identification of the user, as described herein.

According to some embodiments, a smart card or other access control (not shown) may optionally be used with television signal receiver 102 to permit further control of access to the television signals (although of course the present invention is not limited to such an implementation). Television signal receiver 102 also optionally includes an encryptor/decryptor (not shown) which is optionally operatively associated with the data bus 128 and is operative with keys or seeds provided by a smart card through a smart card reader (not shown). It is appreciated that the keys or seeds provided by the smart card may be operative to provide conditional access to the television signals, such that identification of the user as described above may optionally be required in order for the smart card to provide conditional access.

As non-limiting examples, identification of the user may optionally be required to permit content (for example a particular television signal, such as a particular television program) to be purchased through conditional access provided by the smart card, and/or for parental control of access to the television signals. The term "parental control" is used throughout the specification and claims to include control by a person who has right to control what programs another person, or persons, may view and/or record/delete, and/or otherwise use. For example, and without limiting the generality of the foregoing, parental control is typically used to control programs whose viewing by children requires consent of a parent.

For example, parental control may optionally be instituted such that at least certain television signals (video streams) may optionally be accessible only to certain identified user(s) and not to other identified user(s). Such video streams may for example correspond to certain categories or types of video content and/or video content being flagged with one or more tags related to certain aspects of the content.

According to at least some embodiments of the present invention, parental control is implemented by a parental control module 138 at television signal receiver 102, which may optionally be implemented as software (in which case it is optionally stored in memory 126), hardware, firmware or a combination thereof. Parental control module 138 is optionally at least controlled through processor 124. Users who are given permission to alter the functionality of parental control module 138 optionally enter one or more commands through remote control 104, for example to change a default setting or to temporarily allow display of a video stream that would otherwise be blocked, optionally only for the permitted, identified user(s) who are identified according to their skin surface print as described herein.

A non-limiting example of such parental control systems is provided in U.S. Pat. No. 5,666,412 to Handelman et al (incorporated by reference only with regard to FIG. 2 and the accompanying description).

Optionally any reaction of the user is detected by an AMS (audience measurement system) 140 in television signal receiver 102, such as the viewing behavior of the identified user, for example by selecting a channel of television signals to view by sending one or more commands through remote control 104. AMS 140 may then optionally communicate such information, optionally with any statistical analysis, to the broadcaster.

Figure 2:
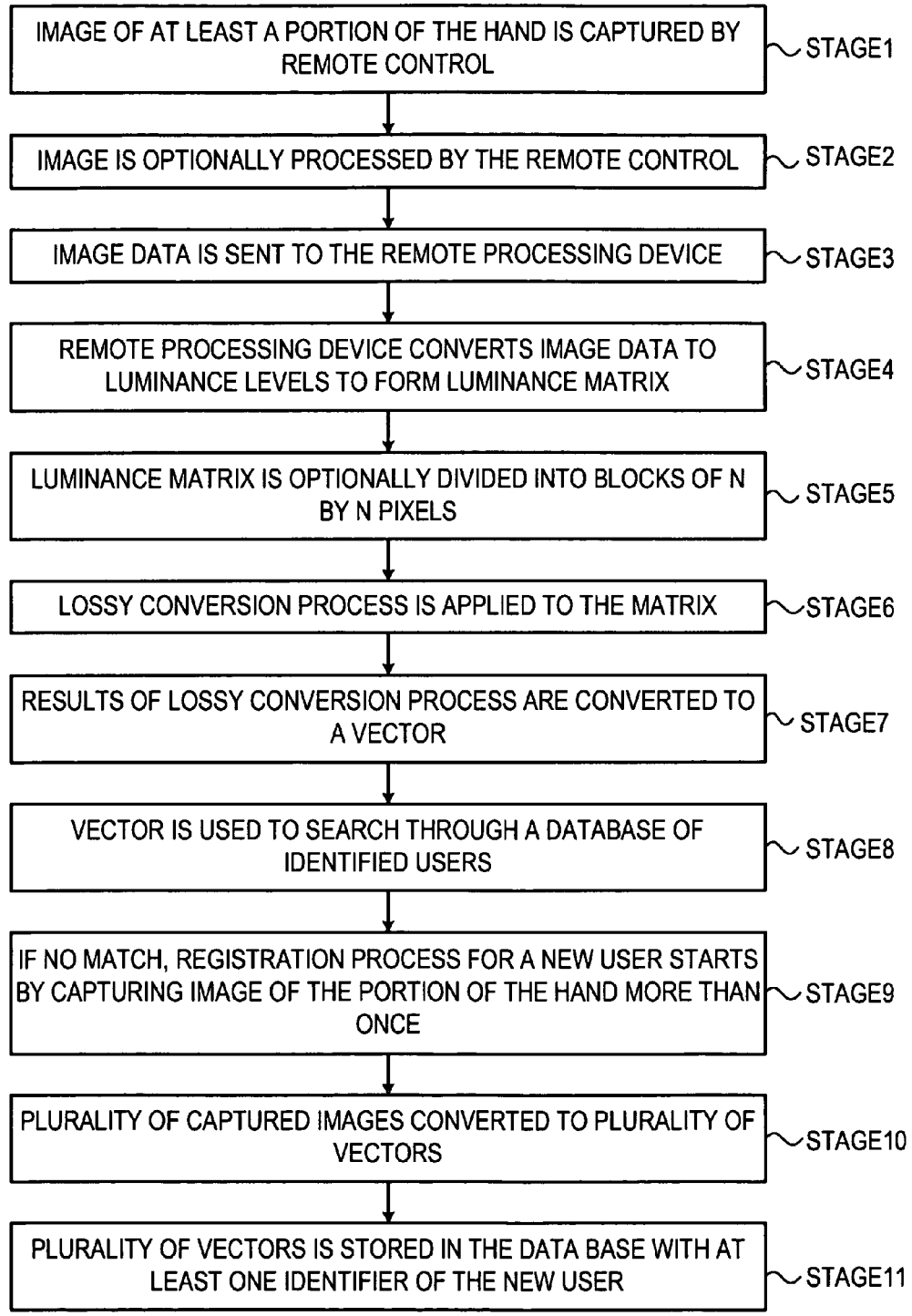
FIG. 2 shows a flowchart of an exemplary, illustrative method for the operation of the system of FIG. 1 with regard to image capture and processing.

FIG. 2 shows a flowchart of an exemplary, illustrative method for the operation of the system of FIG. 1 with regard to image capture and processing.

As shown, in stage 1, an image of at least a portion of the hand is captured by the remote control and specifically by the image capture device of the remote control. The image only includes a skin surface print of the portion of the hand. The portion of the hand optionally includes at least a portion of the hand between a metacarpophalangeal joint and a distal interphalangeal joint of one or more fingers. Optionally, the image does not include the skin surface print of any of the fingertips, or the "fingerprint". Optionally, the image is only of the portion of the hand between a metacarpophalangeal joint and a distal interphalangeal joint of one or more fingers. The image optionally comprises at least 160 pixels by 120 pixels, although of course other image sizes are possible and are contemplated herein.

In stage 2, the image is optionally processed by the remote control, for example to remove any portions of the image related to the fingerprints, if present.

In stage 3, the image data is sent to the remote processing device, whether directly or indirectly (in the latter case, the image data may optionally be sent first to the television signal receiver and then to the remote processing device, for example).

In stage 4, the remote processing device optionally converts the image data to luminance levels to form a luminance matrix. This stage may optionally be performed before or after stage 3. Optionally, in stage 5, the luminance matrix is divided into blocks of N by N pixels, wherein N refers to a number of pixels in each row and in each column of each block of the luminance matrix. Although various block sizes may optionally used, the block size is 16×16 pixels (N=16) or 32×32 pixels (N=32) for example.

In stage 6, a lossy conversion process is applied to the matrix, for example by being applied to the blocks. The lossy conversion process optionally comprises a transform selected from the group consisting of a DCT (discrete cosine transform) transform, and a DFT (discrete Fourier transform). Optionally a filter is also applied as part of the lossy conversion process, such as for example a power vertical vector. Also optionally only a portion of the blocks are selected for application of the lossy conversion process, in which case stages 6-8 are optionally performed more than once. If performed more than once, the selected portions of blocks are optionally contiguous.

In stage 7, the results of the lossy conversion process are optionally converted to a vector, which optionally forms the signature of the user.

In stage 8, the vector is used to search through a database of identified users, in order to identify the user holding the remote control. If stages 6-8 are performed more than once on portions of blocks, then if all or at least most of the resultant vectors fail to match that of a particular user in the database, stages 6-8 may optionally be repeated until at least a majority of the vectors match, or alternatively "no match" may be determined By "most of the resultant vectors" it is optionally meant that at least about 95% of the vectors do not match.

In stage 9, if there is no match in the database, then optionally a registration process for a new user starts by capturing the image of the portion of the hand of the new user, optionally more than once to form a plurality of captured images. Optionally, the user is requested to move the position of the hand on the remote control, so that images may be captured from a plurality of different angles and/or locations; for example, the user may optionally be requested to click a few different buttons on the remote control, causing the movement of the hand on the remote control. In stage 10, the plurality of captured images is converted to a plurality of vectors (as described above).

In stage 11, the plurality of vectors is stored in the database with at least one identifier of the new user. The identifier is optionally a relative identifier to distinguish the vectors of said new user from vectors of one or more other users in the database. Alternatively, the identifier is an absolute identifier selected from the group consisting of a PIN code, and a name.

Figure 3:
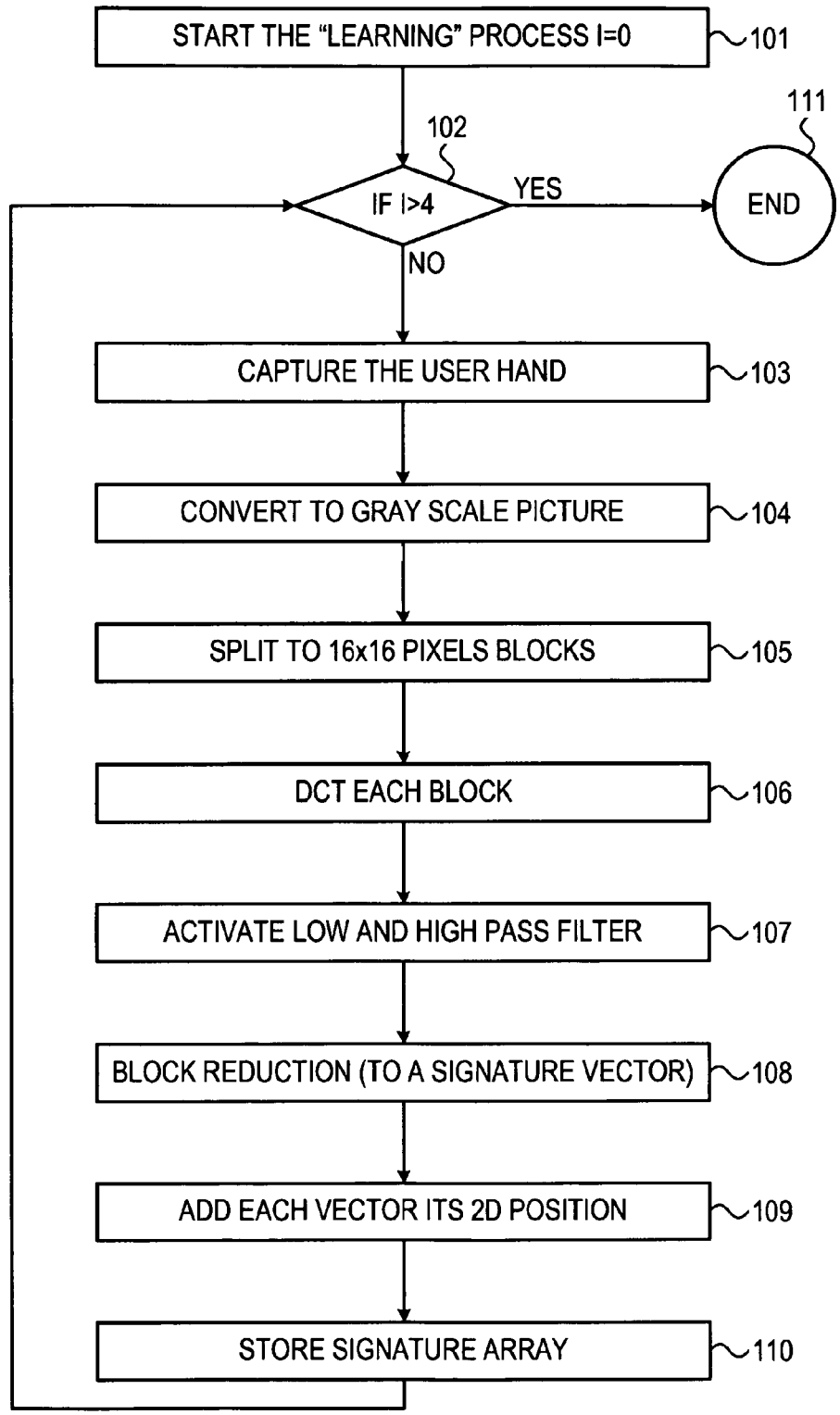
FIG. 3 shows a more detailed example of the registration process of a new user, with more details regarding a non-limiting exemplary embodiment of the method for image processing.

FIG. 3 shows a more detailed example of the registration process of a new user, with more details regarding a non-limiting exemplary embodiment of the method for image processing.

As shown in stage 101, the learning process is started, to register a new user and to derive a signature for the new user. In stage 102, an iterative counter i, which starts at zero, is compared to some maximal value, such as four in this example, which corresponds to the number of images of the new user's hand that are to be captured (i.e. in this example 5 images). If the iterative counter is higher than this maximal value, the process ends at stage 111.

Other in stage 103, the user's hand image is captured. In stage 104, it is optionally converted to luminance levels (gray scale image). In stage 105, it is split into a plurality of blocks. In this simplified, non-limiting example, each block is 8×8 pixels in size, although as previously described, optionally 16×16 or 32×32 pixel blocks are used.

[Luma] Matrix Block

| 168 | 170 | 164 | 168 | 166 | 165 | 169 | 161 |
|-----|-----|-----|-----|-----|-----|-----|-----|
| 173 | 169 | 164 | 170 | 166 | 168 | 165 | 167 |
| 171 | 166 | 170 | 166 | 168 | 166 | 165 | 166 |
| 172 | 167 | 172 | 169 | 165 | 165 | 161 | 163 |
| 164 | 166 | 161 | 167 | 164 | 165 | 162 | 166 |
| 167 | 163 | 161 | 163 | 164 | 162 | 166 | 162 |
| 162 | 165 | 167 | 163 | 169 | 162 | 158 | 163 |
| 166 | 173 | 167 | 161 | 167 | 163 | 165 | 161 |

Applying a DCT transform to the matrix block, as a non-limiting example of such a transform and as shown in stage 106, gives the following result:

[DCT] Matrix:

| 1325 | 11 | 0 | 2 | 2 | −1 | −2 | 0 |
|------|----|----|----|----|----|----|----|
| 10 | 1 | 1 | 2 | 2 | 6 | 1 | −4 |
| 1 | 1 | 0 | 2 | −4 | −3 | −6 | 2 |
| −7 | −5 | 0 | 2 | 1 | 2 | −5 | −3 |
| 1 | 3 | 0 | −1 | −4 | 0 | −3 | −2 |
| −1 | 3 | −4 | −3 | −1 | 0 | −3 | −2 |
| 0 | −1 | 3 | 2 | −3 | 3 | −3 | 4 |
| −2 | −4 | −2 | −2 | 0 | −4 | 0 | 0 |

The calculated DCT matrix is optionally filtered by a reduction of some of the high and low frequencies, through the application of a 2D filter, in stage 107. This can be done by setting the DC low and high frequency cells to zero.

In this non-limiting example:

DCT(1,1)(2,1)(1,2)=0

DCT(7,7)(7,8)(8,7)(8,8)=0

Mathematically this zeroing process may be performed by using matrix sum [x]+[y], in which those (high and low frequencies) cells in the [y] matrix correspond to negative values in the [x] matrix, while the other cells have zeros for their values.

Such a filtering process may optionally be used for example because the DC component includes the brightness of the image; by zeroing the low and high frequency cells, the effect of the light level is removed. This light component (light level) is highly affected by different palm positions and external light (in the room). It should be noted that the depth of the filter is configurable; for example for a 16×16 or 32×32 pixel matrix, the "zero arrays" are wider.

In this example, the result of the low high and DC frequency is:

[Filtered] Matrix Block

| 0 | 0 | 0 | 2 | 2 | −1 | −2 | 0 |
|----|----|----|----|----|----|----|----|
| 0 | 0 | 1 | 2 | 2 | 6 | 1 | −4 |
| 1 | 1 | 0 | 2 | −4 | −3 | −6 | 2 |
| −7 | −5 | 0 | 2 | 1 | 2 | −5 | −3 |
| 1 | 3 | 0 | −1 | −4 | 0 | −3 | −2 |
| −1 | 3 | −4 | −3 | −1 | 0 | −3 | −2 |
| 0 | −1 | 3 | 2 | −3 | 3 | 0 | 0 |
| −2 | −4 | −2 | −2 | 0 | −4 | 0 | 0 |

The result of the filtered matrix is optionally multiplied by the power vertical vector in stage 108:
[1/4,
1,4,
1/2,
1/2,
1/2,
1/2,
1/4,
1,4]

The use of this vector reduces the power of the remaining frequencies, thereby increasing the efficiency of the detection and identification process for future image captures.

This operation on the matrix above reduces it to the following vector:
[−4,
−0.25,
−1.25,
1,
3.75,
1,
−8.75,
−3.5]

The vector is aligned with its native block coordinates (i.e. the x,y coordinates of the capture image matrix) in stage 109, such that the coordinates (x,y) of the position of the block in the captured image are optionally added to the vector to form the signature.

It should be noted that if the captured image is 320×240 pixels, the total number of pixels is 76,800 pixels. Dividing the captured image into to 16×16 pixel blocks results in 300 blocks. Each block contains 16 values+2 coordinates (x,y) of its position in the captured image. The values for each block are optionally stored as a signature in the identification database in stage 110. The process is then optionally repeated as described above.

Figure 4:
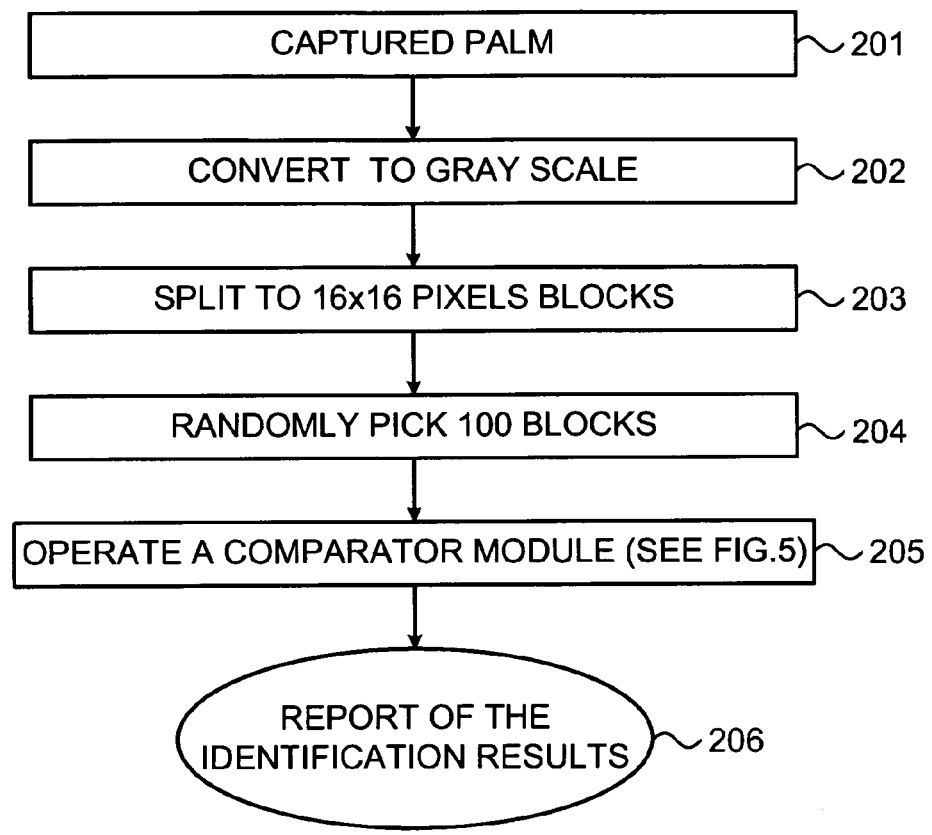
FIGS. 4-6 show a non-limiting example of a method for detection and identification according to at least some embodiments of the present invention.
Figure 5:
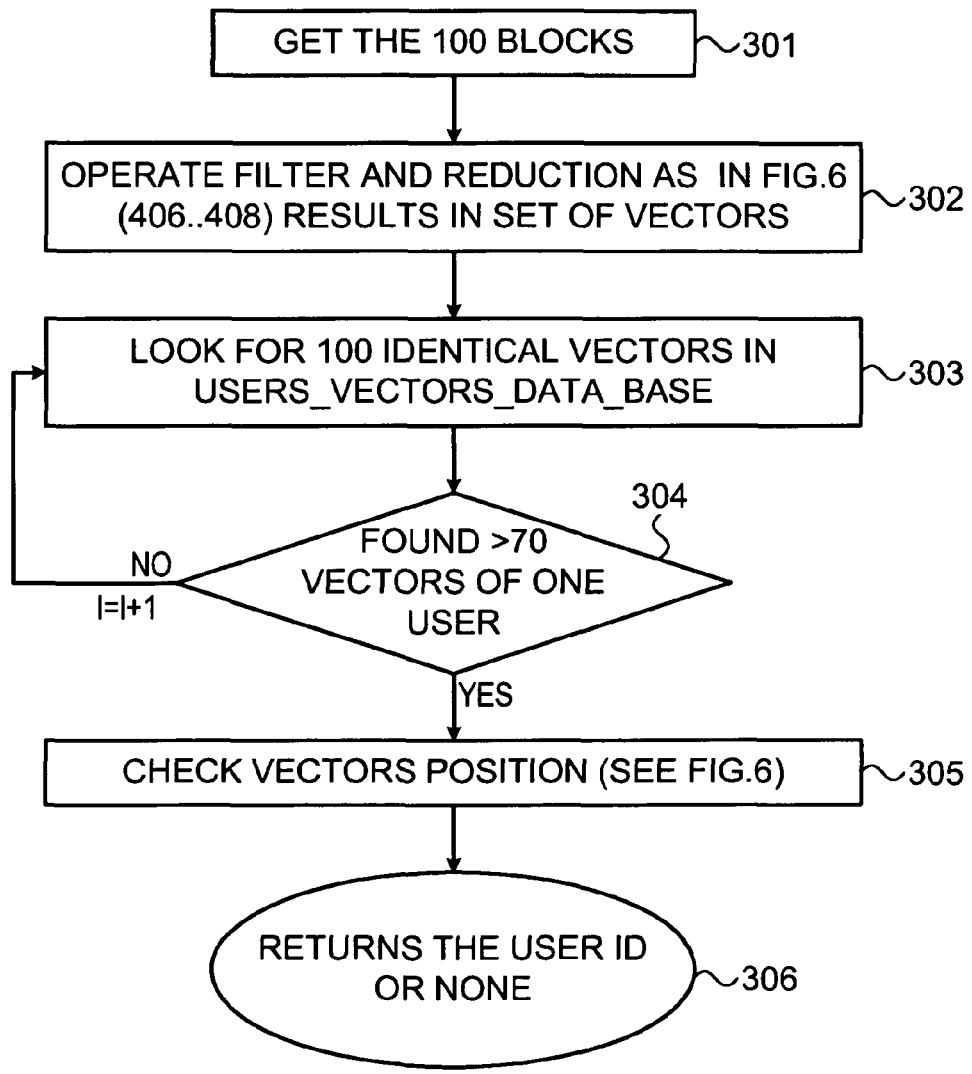
Figure 6:
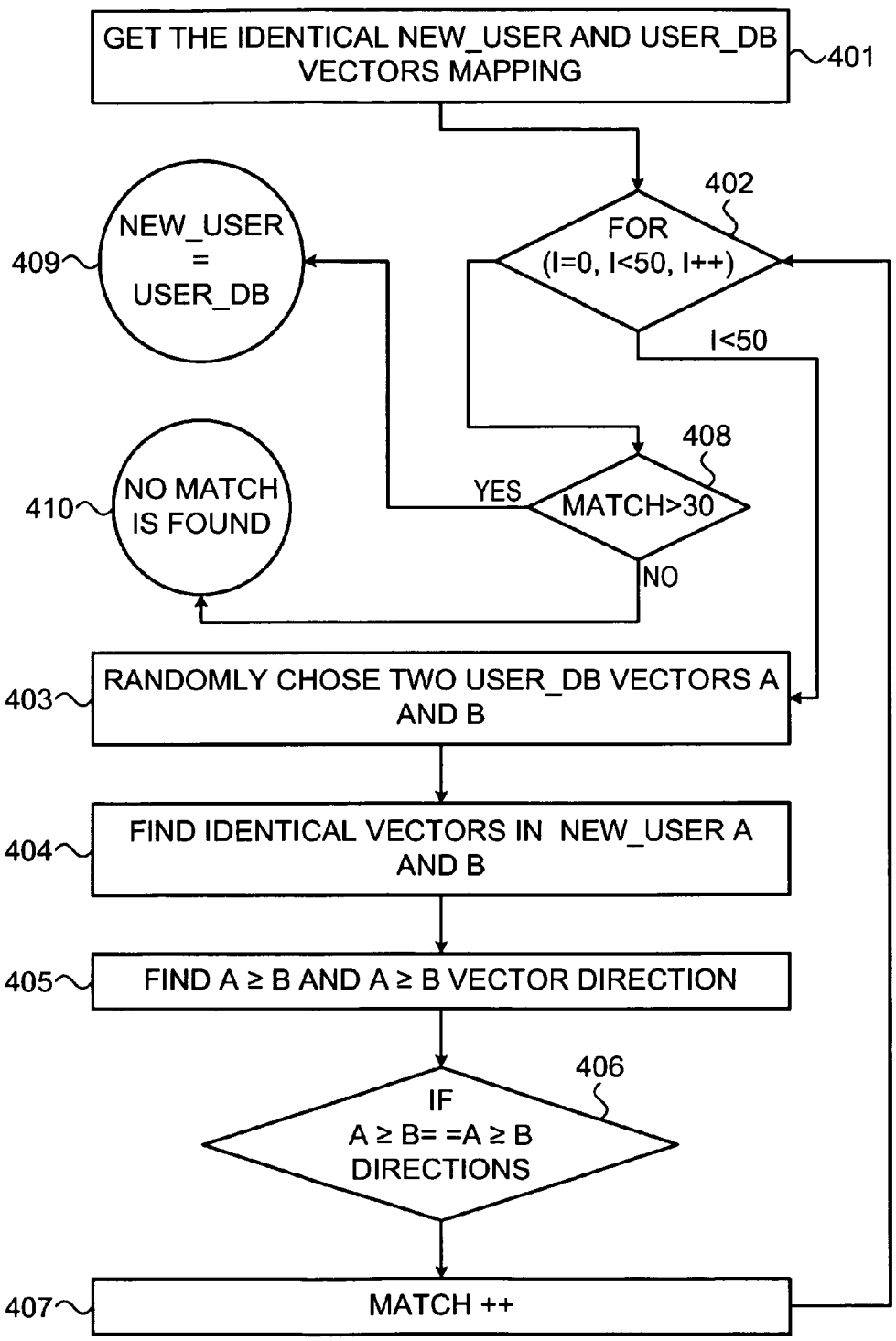

For detection, a non-limiting example of the method is described in FIGS. 4-6. For the description of these Figures, the following terms are used:

user_db refers to the vectors in the data base that are related to a specific user.

users_database is the system database that includes all the users+vectors/signatures of each.

new_user is the user who pressed the remote control button or otherwise activated the identification process (but not a new user to the system)

vector_mapping is the user's vectors that are aligned with the coordinates of the capture.

FIG. 4 shows a non-limiting example of a general method for detection according to at least some embodiments of the present invention.

The detection process starts with the capture of the new_user hand image in stage 201. This can be accomplished with a low cost, low resolution camera, for example. Lighting is provided by the internal infra-red diode of the remote control, for example.

In stage 202, the captured image is converted to luminance levels and is then split into blocks in stage 203, such as 16×16 blocks for example.

From the array of blocks, the remote processing device optionally randomly selects a predetermined number of blocks, such as 100 blocks for example, in stage 204. The blocks are then optionally processed as described in FIG. 5, followed by performing the comparison and identification process (optionally as described in FIGS. 5 and 6), in stage 205.

In stage 206, the identification results are reported.

FIG. 5 is a non-limiting, exemplary method for performing the comparison process according to at least embodiments of the present invention. The process starts in stage 301 with the provision of the selected blocks, such as 100 blocks for example, from FIG. 4. In stage 302, the DCT conversion, filtering and signature creation process is performed as previously described. A search is then performed for identical signatures in the users_database in stage 303. If more the 70 identical signatures related to a single user are found in stage 304, the identification processes optionally continue. Otherwise, if a lower number of identical vectors are found, "No match found" is optionally reported.

In stage 305, the position of the vectors is determined, as described in FIG. 6. As a result of the process shown in FIG. 6, the user identification is returned in stage 306 (or alternatively no identification is returned).

In FIG. 6, the process begins in stage 401, with the new_user signatures and the identical signatures related to a single user that were found in the users_database. The method looks for similarity of direction between the new_user signature array and the user_db signature array. The process is optionally performed a plurality of times, such as 50 times, as shown by the incremental counter of stage 402, to provide a high level of accuracy. As shown, until the process has been performed for the desired number of times, stages 403 to 407 are repeated.

In stage 403, two signatures are randomly selected from those signatures of the user in the database (i.e. from the user_db signatures array). In stage 404, the identical signatures are found in the new_user signatures array. In stage 405, on both arrays (the db and the new), the direction from signature A/a to block B/b is determined. For example, the direction can be: up, down, left, right or a combination of two, such as up and left. If the direction is identical for both the user_db array and the new_user array in stage 406, a match is declared and the Match value is increased by one in stage 407. At the end of the desired number of iterations of this process such as 50 iterations for example, if the number of matches is higher than a predetermined number such as 30 matches in stage 408, "match found" is reported along with the user identifier from the database in stage 409. Otherwise "no match found" is reported in stage 410.

Figure 7A:
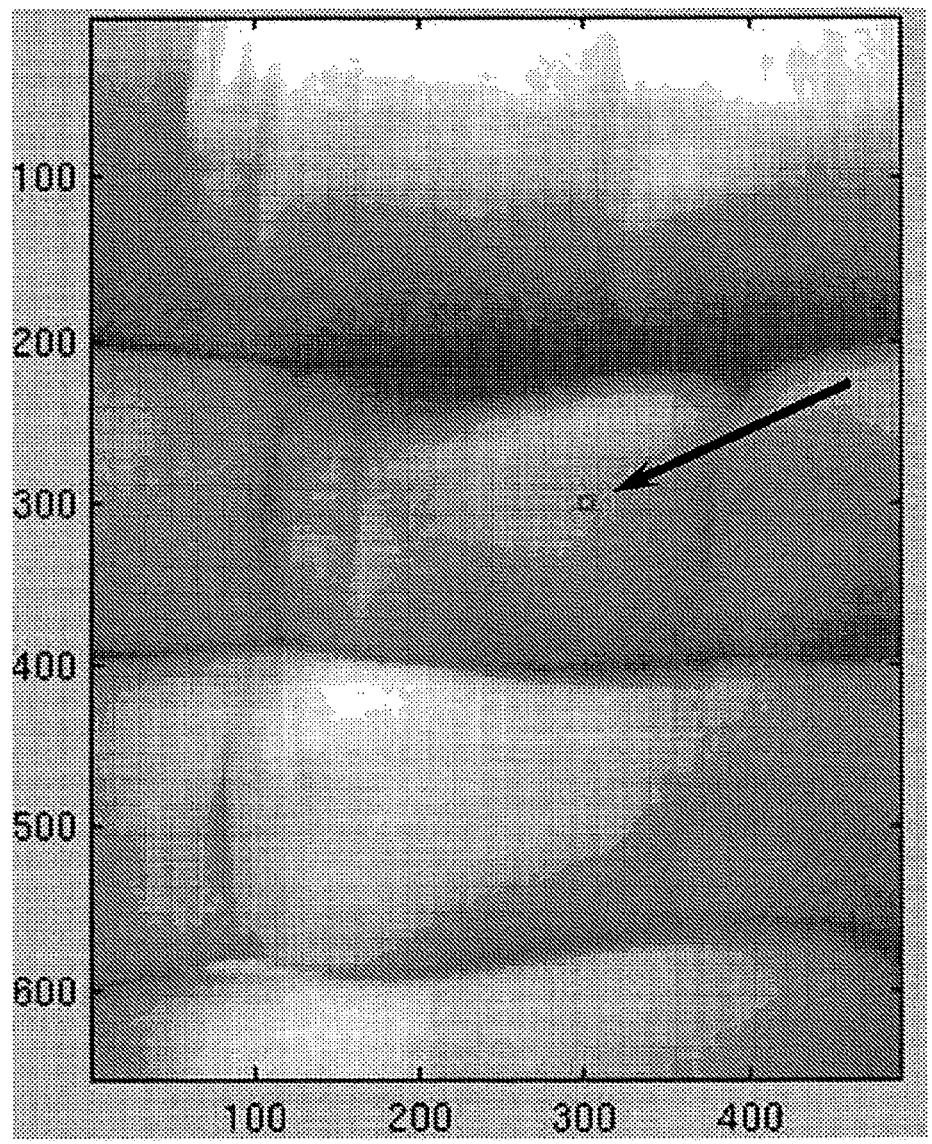
FIG. 7A shows a non-limiting example of an actual image of a portion of the hand.
Figure 7B:
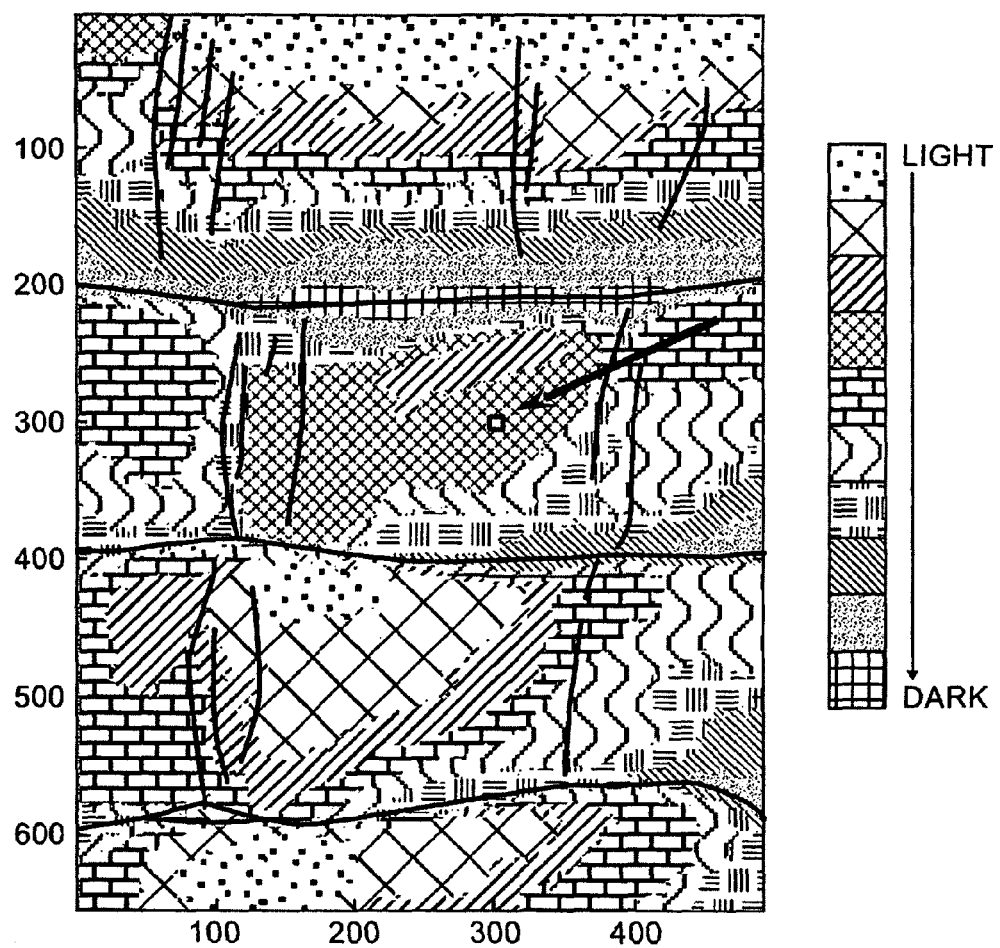
FIG. 7B shows a simplified pictorial representation of the image of FIG. 7A.

FIG. 7A shows a non-limiting example of an actual image of a portion of the hand, as used to provide the mathematical details of the specific detailed example of FIG. 3. FIG. 7B shows a simplified pictorial representation of the image of FIG. 7A. The box on FIG. 7A and on FIG. 7B, indicated by an arrow, relates to the portion of the image providing the data for the 8×8 block of pixels.

Figure 8:
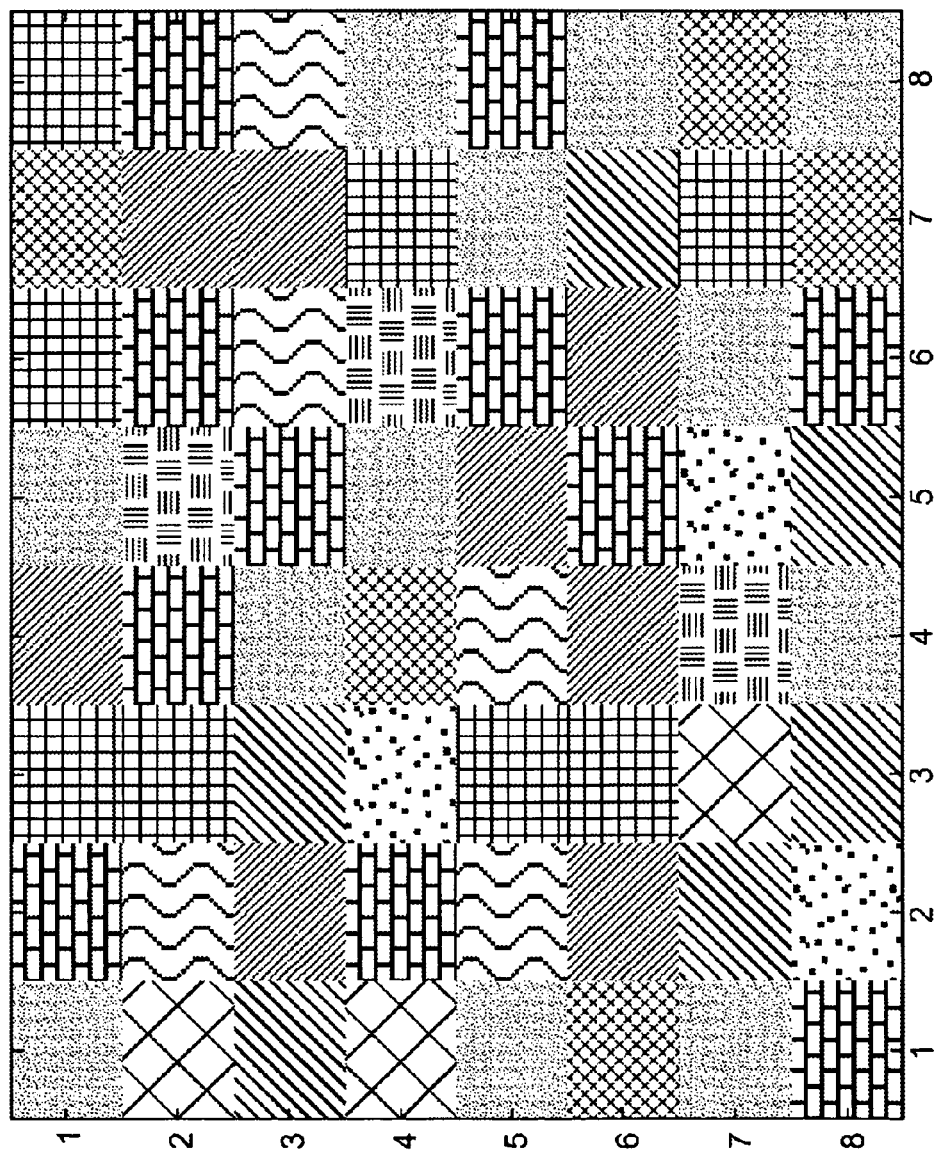
FIG. 8 shows a simplified pictorial representation of a specific block in FIGS. 7A and 7B, magnified to show the gray scale detail.
Figure 8:
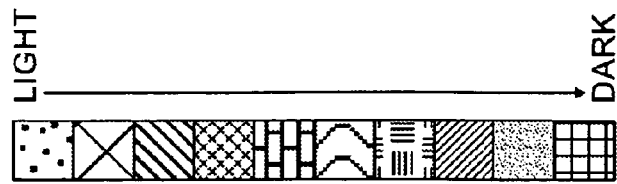

FIG. 8 is a simplified pictorial representation showing the block in FIG. 7A and in FIG. 7B, magnified to show the gray scale detail.

In FIGS. 7B and 8 the gray scale has been simplified for ease of illustration.

It is appreciated that software components of the present invention may, if desired, be implemented in ROM (read only memory) form. The software components may, generally, be implemented in hardware, if desired, using conventional techniques.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination. It will also be appreciated by persons skilled in the art that the present invention is not limited by what has been particularly shown and described hereinabove. Rather the scope of the invention is defined only by the claims which follow.

What is claimed is:

1. A method for identifying a person holding an object with a hand, wherein the object comprises an image capture device and a transmitter, the method comprising:

providing a remote processing device comprising a receiver and a database, wherein the transmitter of the object and said receiver of said remote processing device are in communication and wherein said remote processing device and the object are physically separate;

capturing an image of at least a portion of the hand, said portion of the hand comprising at least a portion of the hand between a metacarpophalangeal joint and a distal interphalangeal joint of one or more fingers, said image featuring only a skin surface print;

sending said image with said transmitter to said receiver;

constructing a signature from data from said image by said remote processing device, said constructing said signature comprising converting said image to luminance levels to form a luminance matrix and converting said luminance matrix to form a vector through a lossy conversion process, wherein said signature comprises said vector, and said converting said luminance matrix to said vector comprises:

dividing said luminance matrix into a plurality of blocks each of N by N pixels, wherein N refers to a number of pixels in each row and in each column of each block of said luminance matrix; and applying said lossy conversion process to at least some of said plurality of blocks, said lossy conversion process comprising a transform selected from the group consisting of a DCT (discrete cosine transform) transform, and a DFT (discrete Fourier transform), and also comprising applying a filter after applying said transform, said applying said filter comprising multiplying by a power vertical vector; and searching through said database for a matching signature to said Signature obtained from said image to identify the person.

2. The method according to claim 1, wherein said image capture device comprises a camera and a light source.

3. The method according to claim 2, wherein said light source comprises an infra red diode.

4. The method according to claim 1, wherein said capturing said image comprises capturing an image of only a portion of the hand between a metacarpophalangeal joint and a distal interphalangeal joint of one or more fingers.

5. The method according to claim 1, wherein said applying said lossy conversion process comprises applying said lossy conversion process only to selected blocks of said plurality of blocks.

6. The method according to claim 5, wherein said applying said lossy conversion process only to selected blocks of said plurality of blocks is performed more than once, such that a vector is generated more than once for each captured image.

7. The method according to claim 6, wherein said applying said lossy conversion process only to selected blocks of said plurality of blocks is performed repeatedly from contiguous blocks from said image.

8. The method according to claim 1, further comprising providing a television receiver for receiving a television signal and a display device in communication with said television receiver, wherein said object is a viewer control for controlling said television receiver and said remote processing device is in communication with said television receiver, the method further comprising identifying the person according to said vector to form an identification of the person; providing said identification to said television receiver by said remote processing device; and adjusting at least one function of said television receiver according to said identification.

9. The method according to claim 8, wherein said television receiver comprises said remote processing device, such that said remote processing device is physically connected to or integrally formed with said television receiver.

10. The method according to claim 8, wherein said television receiver receives a television signal selected from the group consisting of a broadcast television signal, a unicast signal, a multicast signal, a signal transmitted over a cellular telephone network, a signal transmitted over a computer network, a signal transmitted by satellite and a signal transmitted by a cable television network.

11. The method according to claim 8, further comprising controlling access to said television signal according to said identification.

12. The method according to claim 11, wherein said controlling access further comprises purchasing access to said television signal according to said identification.

13. The method according to claim 11, wherein said controlling access further comprises applying one or more parental controls according to said identification.

14. The method according to claim 1, wherein said image comprises at least 160 pixels by 120 pixels.

15. The method according to claim 1, further comprising registering a new person to said database by capturing said image of said portion of the hand more than once to form a plurality of captured images; converting said plurality of captured images to a plurality of vectors; and storing said plurality of vectors in said database with at least one identifier of said new person.

16. The method according to claim 15, wherein said at least one identifier of said new person is a relative identifier to distinguish said vectors of said new person from vectors of one or more other persons in said database.

17. The method according to claim 16, wherein said at least one identifier of said new person is an absolute identifier selected from the group consisting of a PIN code, and a name.

18. A system for identifying a person, the person having a hand, the system comprising:
an object held by at least a portion of the hand of the person, wherein the object comprises an image capture device and a transmitter, wherein said image capture device captures an image of at least a portion of the hand, said image featuring only a skin surface print, said transmitter transmitting said image to a remote processing device external to said system, the remote processing device comprising a receiver and a database, wherein said transmitter of the object and said receiver of the remote processing device are in communication, such that said receiver receives said image from said transmitter, and wherein said remote processing device and the object are physically separate, wherein said remote processing device constructs a signature from data from said image by:
converting said image to luminance levels to form a luminance matrix and converting said luminance matrix to form a vector through a lossy conversion process, wherein said signature comprises said vector, and said converting said luminance matrix to said vector comprises:
dividing said luminance matrix into a plurality of blocks each of N by N pixels, wherein N refers to a number of pixels in each row and in each column of each block of said luminance matrix; and
applying said lossy conversion process to at least some of said plurality of blocks, said lossy conversion process comprising a transform selected from the group consisting of a DCT (discrete cosine transform) transform, and a DFT (discrete Fourier transform), and also comprising applying a filter after applying said transform, said applying said filter comprising multiplying by a power vertical vector, and wherein said remote processing device searches through said database for a matching signature to said signature obtained from said image to identify the person, and wherein said image is of a portion of the hand up to but not including any fingertips, such that either said image capture device captures said image of a portion of the hand up to but not including any fingertips or alternatively, said transmitter transmits only an image of a portion of the hand up to but not including any fingertips.

* * * * *